United States Patent [19]

Yamazaki et al.

[11] Patent Number: 5,013,602
[45] Date of Patent: May 7, 1991

[54] MAGNETIC RECORDING MEDIUM

[75] Inventors: Nobuo Yamazaki; Hiroo Inaba; Kouichi Masaki, all of Kanagawa, Japan

[73] Assignee: Fuji Photo Film Co., Ltd., Kanagawa, Japan

[21] Appl. No.: 247,211

[22] Filed: Sep. 21, 1988

[30] Foreign Application Priority Data

Sep. 21, 1987 [JP] Japan .................................. 62-236877
Sep. 6, 1988 [JP] Japan .................................. 63-221482

[51] Int. Cl.$^5$ .............................................. G11B 23/00
[52] U.S. Cl. ..................... 428/323; 428/329; 428/694; 428/695; 428/900
[58] Field of Search ............... 428/329, 323, 408, 694, 428/695, 900

[56] References Cited

U.S. PATENT DOCUMENTS

| | | | |
|---|---|---|---|
| 4,562,117 | 12/1985 | Kikukawa et al. | 428/900 |
| 4,784,907 | 11/1988 | Matsufuji et al. | 428/900 |
| 4,806,417 | 2/1989 | Saito et al. | 428/900 |
| 4,847,156 | 7/1989 | Nishikawa et al. | 428/900 |
| 4,860,046 | 9/1989 | Moriizumi et al. | 428/900 |

OTHER PUBLICATIONS

Kouichi Masaki, "Surface Modifications of Ferromagnetic Iron Oxide for Magnetic Recording," Scientific Publication of the Fuji Photo Film Co., Ltd., No. 33,20 (and English translation), published Oct. 13, 1987.

Primary Examiner—Paul J. Thibodeau
Attorney, Agent, or Firm—Sughrue, Mion, Zinn, Macpeak & Seas

[57] ABSTRACT

A magnetic recording medium is described, comprising a nonmagnetic support having thereon a single magnetic layer or plural magnetic layers containing ferromagnetic particles dispersed in a binder, wherein said ferromagnetic particles are ferromagnetic particles of the magnetic iron oxide type having an adsorption amount of stearic acid of from $3 \times 10^{-6}$ to $6 \times 10^{-6}$ mol/m$^2$ per a surface area thereof; said binder contains at least one polymer having at least one polar group selected from the group consisting of —SO$_3$M, —O-SO$_3$M, —OPO(OM')$_2$, —COOM and —PO(OM')$_2$, in which M represents Na, Li, K, a hydrogen atom, NR$_4$ or NHR$_3$, M' represents Na, Li, K, a hydrogen atom, NR$_4$, NHR$_3$ or an alkyl group, and R$_3$ and R$_4$ represent a lower alkyl group; and said magnetic layer further contains at least one fatty acid.

9 Claims, 1 Drawing Sheet

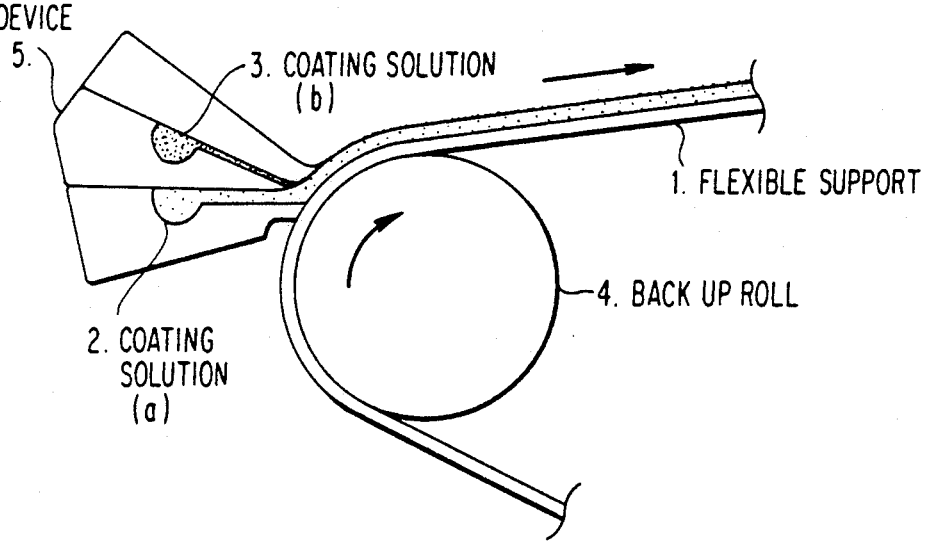
Fig.

1

MAGNETIC RECORDING MEDIUM

FIELD OF THE INVENTION

The present invention relates to an improved magnetic recording medium comprising a nonmagnetic support and a magnetic layer.

BACKGROUND OF THE INVENTION

A magnetic recording medium comprising a nonmagnetic support having thereon a single magnetic layer or plural magnetic layers containing ferromagnetic particles composed of acicular crystals such as $\gamma$-$Fe_2O_3$, Co-containing magnetic iron oxide or $CrO_2$ dispersed in a binder is generally used as a magnetic recording medium for use in audio recording, video recording or computers (hereinafter referred to simply as "magnetic tape" in some cases).

Recently, however, higher density recording has been demanded for magnetic recording media, and much finer ferromagnetic particles than conventional ones have been used. Much higher recording has been necessary, particularly for a video tape, as recording wavelengths have shortened and track widths have narrowed, and thus a video tape using much finer ferromagnetic particles than conventional ones has been used.

If such more finely divided ferromagnetic particles (for example, ferromagnetic particles having the average length in the long axis of 0.45 $\mu$m or less and a specific surface area ($S_{BET}$) of 25 $m^2/g$ or more) are used and if the surface of a magnetic layer can be made smooth, it is known that higher density recording can be realized and that electromagnetic characteristics can be improved. However, there is the problem that the dispersibility of finely granulated ferromagnetic particles is decreased, and, therefore, the use of finely granulated ferromagnetic particles is not always satisfactory. Recently, the dispersibility of finely granulated ferromagnetic particles has been fairly improved by using binders having a polar group or by improving the dispersing method, and thus excellent electromagnetic characteristics can be obtained.

On the other hand, when the surface of a magnetic layer is made smooth, the friction coefficient as a result of contact between a magnetic layer and a running system is increased while the video tape is running, whereby a magnetic layer is likely to be damaged or to peel apart from a support in a short period of use. Particularly in a video tape, a video head and a magnetic medium run at high speed while in contact each other, and, therefore, ferromagnetic particles are likely to drop off from the magnetic layer, resulting in head clogging of a magnetic head. Accordingly, an improvement in running properties of a magnetic layer of a video tape is necessary.

It has hithertofore been proposed that abrasive agents (hard particles) such as corundum, silicon carbide or chromium oxide be added to a magnetic layer in order to improve the running properties of a magnetic layer. When abrasive agents are added to a magnetic layer to improve the running properties of a magnetic layer, a large amount of the abrasive agents must be added to exhibit the desired abrasive effect. However, a large amount of the abrasive agents contained in the magnetic layer causes wear of a magnetic head, and prevents improving the electromagnetic characteristics resulting from smoothing a magnetic layer. Therefore, the addition of abrasive agents is not a desirable approach.

It has also been proposed in JP-A-60-205827 (the term "JP-A" as used herein refers to a "published unexamined Japanese patent application") and JP-A-60-98526 that a fatty acid or an ester of a fatty acid and an aliphatic alcohol be added to a magnetic layer as a lubricating agent to reduce the friction coefficient. However, such lubricating effects are not fully exhibited in a magnetic recording medium using finely granulated ferromagnetic particles in many cases.

Accordingly, comparatively excellent electromagnetic characteristics have come to be obtained, but it is difficult to simultaneously secure excellent running properties.

SUMMARY OF THE INVENTION

An object of the present invention is to provide a magnetic recording medium having simultaneously improved electromagnetic characteristics and running properties.

The present invention relates to a magnetic recording medium comprising a nonmagnetic support having thereon a single magnetic layer or plural magnetic layers containing ferromagnetic particles dispersed in a binder, wherein the ferromagnetic particles are ferromagnetic particles of the magnetic iron oxide having an adsorption amount of stearic acid of from $3 \times 10^{-6}$ to $6 \times 10^{-6}$ mol/$m^2$ per a surface area thereof; the binder contains at least one polymer having at least one polar group selected from the group consisting of —$SO_3M$, —$OSO_3M$, —$OPO(OM')_2$, —COOM and —$PO(OM')_2$, in which M represents Na, Li, K, a hydrogen atom, $NR_4$ or $NHR_3$, M' represents Na, Li, K, a hydrogen atom, $NR_4$, $NHR_3$ or an alkyl group, and $R_3$ and $R_4$ represent a lower alkyl group; and the magnetic layer further contains at least one fatty acid.

BRIEF DESCRIPTION OF THE DRAWING

The figure is an exemplary drawing showing an embodiment of an apparatus for conducting a wet-on-wet coating method (i.e., simultaneous multiple layered coating method) for providing a magnetic recording medium according to the present invention. In the drawing, 1 is a flexible support;
2 is a coating solution (a);
3 is a coating solution (b);
4 is a back up roll; and
5 is a simultaneous multiple layer coating

DETAILED DESCRIPTION OF THE INVENTION

The magnetic layer of the magnetic recording medium of the present invention thus contains at least magnetic iron oxide type ferromagnetic particles having a predetermined adsorption amount of stearic acid, a polymer having a predetermined polar group, and at least one fatty acid.

The use of magnetic iron oxide type ferromagnetic particles having a predetermined adsorption amount of stearic acid prevents the fatty acid lubricating agent from excessively adsorbing onto the magnetic iron oxide type ferromagnetic particles. Thus, lubricating effects of the fatty acid are fully exhibited. In this case, however, the magnetic iron oxide type ferromagnetic particles having the predetermined adsorption amount of stearic acid have poor dispersibility and generally cannot be fully dispersed in a polymer binder so that high surface smoothness of a magnetic layer cannot be obtained. Accordingly, by using the polymer having a predetermined polar group, excellent dispersibility can be obtained. That is, excellent dispersibility and improved lubricating effects and good running properties are simultaneously obtained by using the above-described ferromagnetic particles of magnetic iron oxide type, polymers and at least one fatty acid.

The magnetic recording medium of the present invention has a fundamental structure comprised of a non-magnetic support having thereon a single magnetic layer or plural magnetic layers containing ferromagnetic particles.

Examples of the nonmagnetic support for use in the present invention include a synthetic resin film such as polyethylene terephthalate, polypropylene, polycarbonate, polyethylene naphthalate, polyamide, polyamidoimide or polyimide, and a metal foil such as an aluminum foil or a stainless foil. The nonmagnetic support generally has a thickness of from 2.5 to 100 $\mu$m and preferably from 3 to 70 $\mu$m.

A backing layer may be provided on the surface of a support opposite to a magnetic layer, according to U.S. Pat. No 4,567,063.

As described above, a magnetic recording medium of the present invention is a medium comprising a non-magnetic support having thereon a single magnetic layer or plural magnetic layers containing ferromagnetic particles.

The magnetic layer of the present invention includes at least magnetic iron oxide type ferromagnetic particles having a predetermined adsorption amount of stearic acid, a polymer having a predetermined polar group and a fatty acid.

The ferromagnetic particles of the present invention are magnetic iron oxide type ferromagnetic particles having an adsorption amount of stearic acid per surface area of the particles of from $3\times10^{-6}$ to $6\times10^{-6}$ mol/m$^2$. When the magnetic layer comprises plural magnetic layers, the magnetic iron oxide type ferromagnetic particles of the plural magnetic layers have an adsorption amount of stearic acid per surface area of the particles of from $3\times10^{-6}$ to $6\times10^{-6}$ mol/m$^2$. Then, the adsorption amount of stearic acid of an upper layer may be larger or smaller than that of a lower layer, or may be equal to that of the lower layer.

If the adsorption amount of stearic acid is less than $3\times10^{-6}$ mol/m$^2$, the surface gloss of the obtained magnetic recording medium is deteriorated. If the adsorption amount of stearic acid is more than $6\times10^{-6}$ mol/m$^2$, the surface gloss and the still durability of the magnetic recording medium obtained using magnetic particles which are not treated are remarkably deteriorated, and further the friction coefficient after running for 1 pass and 100 passes is increased with an unstable running property. The magnetic iron oxide type ferromagnetic particles having the above-described adsorption amount of stearic acid can be obtained by treating the surface of magnetic iron oxide type ferromagnetic particles with compound such as Si, Al, Ca, Sn, Zn and Ti (for example, only water glass (i.e., sodium silicate) or the combination of water glass and chloride such as aluminum chloride, calcium chloride, etc). By the above treatment, excessive adsorption of fatty acid which is used as a lubricating agent on the magnetic iron oxide type ferromagnetic particles can be prevented, and thus the lubricating effect of the fatty acid is fully exhibited. The same effect as above can also be obtained in the case of other lubricating agents other than the fatty acid, such as fatty acid ester, a higher alcohol or the like, but the best effect can be obtained particularly when fatty acid is used as a lubricating agent.

In the case the magnetic iron oxide type ferromagnetic particles are so excessively surface-treated with the sodium silicate, etc., that the adsorption amount of the above stearic acid is lower than the predetermined range, not only does the fatty acid not adsorb as a lubricating agent, but also the adsorption amount of the binder decreases, and whereby the dispersibility of the above ferromagnetic particles becomes poor.

The binder of the present invention contains at least one polymer having at least one polar group selected from the group consisting of —SO$_3$M, —OSO$_3$M, —OPO(OM')$_2$, —COOM and —PO(OM')$_2$, in which M represents Na, Li, K, a hydrogen atom, NR$_4$ or NHR$_3$, M, represents Na, Li, K, a hydrogen atom, NR$_4$, NHR$_3$ or an alkyl group, R$_3$ and R$_4$ represent a lower alkyl group (preferably having from 1 to 8 carbon atoms), and two M' moieties may be the same or different.

The above-described surface treated ferromagnetic particles have reduced dispersibility, and, as general polymers cannot be fully dispersed, and whereby a highly smooth surface on a magnetic layer cannot be obtained. Accordingly, by using the polymer having the above-described predetermined polar group(s), excellent dispersibility can be ensured. That is, excellent dispersibility and improved lubricating effects can be simultaneously obtained using the above-described ferromagnetic particles comprising the magnetic iron oxide type, the above-described polymers and the above-described polymers and the above-described fatty acid.

Ferromagnetic particles for use in the present invention are the above-described predetermined magnetic iron oxide type ferromagnetic particles. The examples of ferromagnetic particles which are suitable to be surface treated include $\gamma$-Fe$_2$O$_3$, Berthollide iron oxide represented by formula FeOx (generally $1.33 < X < -1.5$ and preferably $1.38 < X < 1.5$), Fe$_3$O$_4$, and hexagonal system ferrite such as Co-modified iron oxide, Co-Ti-modified barium ferrite or Co-Ti-modified strontium ferrite. The above ferromagnetic particles have a specific surface area (B.E.T. Method) of generally 25 m$^2$/g or higher, and preferably 40 m$^2$/g or higher.

The magnetic iron oxide type ferromagnetic particles having an adsorption amount of stearic acid per surface area of from $3\times10^{-6}$ to $6\times10^{-6}$ mol/m$^2$ can be obtained by surface treating the above ferromagnetic particles with a compound containing Si, Al, Ca, Sn, Zr or Ti. The above surface treatment can be conducted, for example, by mixing and heating the magnetic iron oxide type ferromagnetic particles and, e.g., water glass (i.e., sodium silicate) in an aqueous alkaline solution. That is, the pH of the aqueous alkaline solution is generally from 8 to 13 and preferably from 8 to 11, the temperature heated is generally from 40° to 250° C. and preferably from 50° to 200° C., and further the time heated is preferably from 0.5 to 5 hours.

Ferromagnetic metal particles in addition to the above-described ferromagnetic particles may be used in the present invention. Such ferromagnetic metal particles generally have a metal content of 75 wt% or more, and 80 wt% or more of the metal content is at least a ferromagnetic metal or alloy (e.g., Fe, Co, Ni, Fe-Co, Fe-Ni, Co-Ni, Co-Ni-Fe), and 20 wt% or less of the metal content may be another component(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P). The above-described ferromagnetic metal content may contain a slight amount of water, hydroxide(s) or oxide(s). The method for preparing the above ferromagnetic metal particles is conventional and ferromagnetic alloy particles used in the present invention can be prepared in a conventional manner.

The shape of the ferromagnetic particles is not particularly limited, and those which are acicular, granular, dice-like, ellipsoidal and plate-like are generally used.

The polymers having the above-described polar group used as a binder for forming a magnetic layer of the present invention include resins such as copolymers of the vinyl chloride type (e.g., copolymers of vinyl chloride, copolymers of vinyl chloride and vinyl acetate, copolymers of vinyl chloride, vinyl acetate and vinyl alcohol, copolymers of vinyl chloride, vinyl acetate and maleic acid, copolymers of vinyl chloride and vinylidene chloride); acrylic resins (e.g., copolymers of vinyl chloride and acrylonitrile, copolymers of vinylidene chloride and acrylonitrile, copolymers of (meth)acrylic acid ester and acrylonitrile, copolymers of (meth)acrylic acid ester and vinylidene chloride, copolymers of (meth)acrylic acid ester and styrene, copolymers of butadiene and acrylonitrile, polyurethane resins); polyester resins; polyvinyl fluoride; polyamide resins; polyvinyl butyrate; and copolymers of styrene and butadiene, having introduced therein at least one kind of the above polar groups (e.g., $-SO_3M$, $-OSO_3M$, $-COOM$, $-PO(OM')_2$ and $-OPO(OM')_2$). Copolymers of vinyl chloride type (which have a molecular weight of generally from 10,000 to 100,000 and preferably from 20,000 to 50,000) having introduced therein a polar group (which is preferably $-SO_3Na$, $-SO_3H$, $-OPO_3H_2$, $-COOH$, or $-SO_3H$) are preferred.

The above-described polar group is preferably contained in an amount of generally from $1 \times 10^{-6}$ to $1 \times 10^{-3}$ equivalent/g and preferably from $1 \times 10^{-6}$ to $1 \times 10^{-4}$ equivalent/g, in the above polymer.

In addition to the polymers having the above-described polar group, resins such as thermoplastic resins, thermosetting resins or reactive type resins can be used alone or in combination therewith.

Thermoplastic resins are those having an average molecular weight of generally from 10,000 to 200,000 and a degree of polymerization of from about 200 to 2,000. Such thermoplastic resins include copolymers of vinyl chloride and vinyl acetate (e.g., copolymers of vinyl chloride and vinyl acetate, copolymers of vinyl chloride, vinyl acetate and vinyl alcohol, copolymers of vinyl chloride, vinyl acetate and maleic acid); copolymers of vinyl chloride and vinylidene chloride; acrylic resins (e.g., copolymers of vinyl chloride and acrylonitrile, copolymers of vinylidene chloride and acrylonitrile, copolymers of (meth)acrylic acid ester and acrylonitrile, copolymers of (meth)acrylic acid ester and vinylidene chloride, copolymers of (meth)acrylic acid ester and styrene, copolymers of butadiene and acrylonitrile); cellulose derivatives (e.g., cellulose acetate butyrate, cellulose diacetate, cellulose triacetate, cellulose propionate, cellulose acetate propionate, nitrocellulose, cellulose acetate); various synthetic rubber type thermoplastic resins (e.g., polybutadiene, chloroprene, polyisoprene, copolymers of styrene and butadiene); polyurethane resins; polyvinyl fluoride; polyamide resins; polyvinyl butyrate; copolymers of styrene and butadiene; and polystyrene resins. These can be used alone or in combination.

Thermosetting or reactive type resins are those resins having an average molecular weight of generally 200,000 or lower and preferably from 20,000 to 200,000 when they are in a coating composition, and the molecular weight thereof becomes nearly infinite due to a condensation reaction or an adduct reaction after coating. When these resins are resins which are hardened by heating, resins which do not soften nor melt until they are hardened by heating are preferred. Examples of these resins include phenol and formalin novolak resins, phenol and formalin resol resins, phenol and furfural resins, xylene and formalin resins, urea resins, melamine resins, drying oil modified alkyd resins, phenol resin modified alkyd resins, maleic acid resin modified alkyd resins, unsaturated polyester resins, a combination of an epoxy resin(s) and a hardening agent(s) (e.g., polyamine, acid anhydrides, polyamide resins), moisture hardenable resins having an isocyanate polyether terminal(s), polyisocyanate prepolymers (e.g., a reaction product having at least three isocyanate groups in its molecule obtained by reacting a diisocyanate and a triol having a low molecular weight, trimer and tetramer of diisocyanate), and a combination of a polyisocyanate prepolymer and resins having an active hydrogen (e.g., polyester polyols, polyether polyols, copolymers of acrylic acid, copolymers of maleic acid, copolymers of 2-hydroxyethyl methacrylate, copolymers of p-hydroxystyrene). These can be used alone or in mixture.

It is preferred that a mixture of a copolymer (A) of vinyl chloride type having a polar group of the present invention and a polyurethane resin(s) (B) be used as a binder. However, the copolymer having a polar group of the present invention may be used singly as binders. The ratio of the copolymer (A) to the polyurethane resin (B) which is used is preferably from 1/3 to 1/0.1.

The binder is used in an amount of generally from 10 to 100 parts by weight, and preferably from 15 to 50 parts by weight, per 100 parts by weight of the ferromagnetic particles.

The fatty acids of the present invention are not particularly limited, but fatty acids having from 8 to 22 carbon atoms and particularly from 14 to 20 carbon atoms are preferred such as caprylic acid, capric acid, lauric acid, myristic acid, palmitic acid, stearic acid, oleic acid, elaidic acid, linolic acid, linolenic acid, stearolic acid, or behenic acid.

The fatty acids are preferably added into the magnetic coating composition in view of the simplicity of addition. The addition amount thereof used in the coating composition is preferably from 0.01 to 10.0 wt%, and more preferably from 0.05 to 6 wt%, based on the weight of the ferromagnetic particles.

The magnetic layer of a magnetic recording medium of the present invention preferably contains inorganic particles having a Mohs' hardness of 5 or higher. The particle size of the inorganic particles is generally from 0.05 to 1.0 μm and preferably from 0.1 to 0.5 μm.

The inorganic particles used are not particularly limited so long as they have a Mohs' hardness of 5 or higher. Examples of the inorganic particles having a Mohs' hardness of 5 or higher include $Al_2O_3$ (Mohs' hardness 9), $TiO_2$ (6.5), $SiO_2$ (7), $SnO_2$ (6.5), $Cr_2O_3$ (9) and $\alpha\text{-}Fe_2O_3$ (5.5).

The content of the inorganic particles is generally from 0.1 to 20 parts by weight, and preferably from 1 to 10 parts by weight, per 100 parts by weight of the ferromagnetic particles.

It is also desirable that carbon black (particularly carbon black having an average particle diameter of from 10 to 300 m$\mu$) be included in the magnetic layer in addition to the above-described inorganic particles.

The amount of carbon black used is generally from 0 to 30 parts by weight and preferably from 0.1 to 10 parts by weight per 100 parts by weight of the ferromagnetic particles.

The method for preparing a magnetic recording medium of the present invention is hereinafter illustrated.

Upon preparing a magnetic layer of a magnetic recording medium of this invention, the treated ferromagnetic particles, binder(s) and the fatty acid(s), and if desired, an abrasive agent(s) such as $\alpha$-Al$_2$O$_3$, Cr$_2$O$_3$ and inorganic particles as described above, and a filler(s) such as $\alpha$-Fe$_2$O$_3$ are generally mixed and kneaded together with a solvent to prepare a magnetic coating composition.

A solvent used upon mixing and kneading is a solvent as conventionally used for preparing a magnetic coating composition, such as methyl ethyl ketone or the like.

The method for mixing and kneading is not particularly limited and ones conventionally used for preparing a magnetic coating composition can be used; the order of adding the components is optionally determined.

A conventional mixing and kneading machine is used for preparing the magnetic coating composition such as, for example, a two-roll mill, a three-roll mill, a ball mill, a pebble mill, a trommel, a sand grinder, a Szegvari Attritor, a high speed impeller dispersing device, a high speed stone mill, a high speed impact mill, a disper, a kneader, a high speed mixer, a homogenizer or an ultrasonic dispersing device. Using such a mixing and kneading device and in accordance with the conventional manner for mixing, kneading and dispersing, a magnetic coating composition is prepared.

Upon preparing a magnetic coating composition, known additives such as dispersing agents or antistatic agents may be used in combination.

The thus prepared magnetic coating composition is coated on the above-described nonmagnetic support. The magnetic layer may be directly provided on the above-described nonmagnetic support, and may be provided thereon through an adhesive or subbing layer.

The methods for coating the magnetic coating composition on a nonmagnetic support are conventional and include air doctor coating, blade coating, rod coating, extruding coating, air knife coating, squeeze coating, impregnating coating, reverse roll coating, transfer roll coating, gravure coating, kiss coating, cast coating, spray coating, spin coating and the like. Methods other than the above can also be used.

A coating method according to a simultaneous or successive wet coating method (hereinafter referred to as a wet-on-wet coating method) as disclosed in JP-A-61-139929 and JP-A-61-54992 is useful for providing plural layers of the magnetic layer (i.e., plural magnetic layers).

That is, the wet-on-wet coating method which means providing wet magnetic layers on a support includes a successive method which comprises coating a first layer, coating a second layer while the first layer is still wet and then coating a third layer and so on successively, and an extrusion coating method which comprises coating multiple layers simultaneously.

The above wet-on-wet coating method is carried out according to the method illustrated in FIG. 1. The wet-on-wet coating method is not limited to that as described above. For example, an extrusion type simultaneous multiple coating method as shown in FIG. 1 can be applied in the present invention. FIG. 1 illustrates a coating method of coating the first coating solution (a) 2 and the second coating solution (b) 3 on a flexible support 1 simultaneously using a simultaneous multiple layer coating device 5.

The thus-coated magnetic layer has a dry thickness of generally from about 0.5 to 10 $\mu$m, preferably from 1.5 to 7.0 $\mu$m.

When the magnetic layer comprises plural magnetic layers, the coated upper magnetic layer has preferably a dry thickness of from 0.1 to 1.5 $\mu$m, provided that the total dry thickness of the upper and lower magnetic layers is generally from about 0.5 to 10 $\mu$m and preferably from 1.5 to 7.0 $\mu$m.

That is, the magnetic layers of the present invention can be prepared according to the method as described in JP-A-60-125920.

When the magnetic recording medium has a tape shape, the magnetic layer thus-provided on the nonmagnetic support is subjected to conventional magnetic orientation to orientate the ferromagnetic particles contained in the magnetic layer and dried in a conventional manner, and, if desired, is surface smoothed in a conventional manner. The surface treated magnetic recording medium is then cut to a desired shape.

That is, the magnetic recording medium of the present invention can be prepared according to the methods as described in U.S. Pat. No. 3,783,023 and JP-B-48-5350 (the term "JP-B" as used herein refers to an "examined Japanese patent publication").

The present invention will be illustrated in more detail by the following examples and comparative examples, where all parts are by weight.

EXAMPLE 1

Preparation of Surface Treated Ferromagnetic Particles (1)

300 g of Co-modified acicular magnetic iron oxide (specific surface area (S$_{BET}$): 45.7 m$^2$/g; long axis length: 0.13 $\mu$m, short axis length: 0.018 82 m) was added to the 2 liters of an aqueous solution of sodium hydroxide adjusted to a pH of 10, and was dispersed by a homomixer to obtain an aqueous slurry of the Co-modified magnetic iron oxide. While the slurry was heated to 0° C., water-soluble water glass (i.e., sodium silicate) was dissolved in 100 ml of distilled water and was dropwise added to the slurry at a rate of 5 ml/min. while stirring so that the ratio of water-soluble water glass to the Fe in the Co-modified magnetic iron oxide was 0.2 wt% in terms of Si conversion. After the water glass solution was dropwise added, carbon dioxide gas was introduced into the slurry at a rate of 0.2 liter/min. to adjust the pH of the slurry to 7.5. The slurry was then stirred for 30 minutes, filtered, and then dried in a nitrogen gas atmosphere at 70° C. to obtain surface treated Co-modified magnetic iron oxide (Sample C).

Following the same procedure as described above, surface treated Co-modified magnetic iron oxide (Samples B and E to F, and Sample A (untreated)) were obtained, provided that the ratio (wt%) of water-soluble water glass to Fe in the Co-modified iron oxide in terms of Si conversion was varied. The adsorption amount of stearic acid of each sample is shown in Table 1.

TABLE 1

| Sample No. | Water-Soluble Water Glass (Si conversion wt %) | Adsorption Amount of Stearic Acid (mol/m$^2$) |
| --- | --- | --- |
| A (untreated) | 0 | 7.5 × 10$^{-6}$ |
| B | 0.1 | 5.7 × 10$^{-6}$ |
| C | 0.2 | 3.2 × 10$^{-6}$ |
| D | 0.3 | 3.1 × 10$^{-6}$ |
| E | 0.4 | 2.5 × 10$^{-6}$ |
| F | 0.6 | 2.4 × 10$^{-6}$ |

The adsorption amount of stearic acid shown in the above Table 1 was measured in the following manner.

5 g of ferromagnetic particles of the thus-obtained surface treated Co-modified magnetic iron oxide was added to a 100 ml triangular flask charging a methyl ethyl ketone solution (50 ml) containing stearic acid in an amount of 2 wt%, and was stirred at 25° C. for 25 hours by a magnetic stirrer while the flask was sealed. The solution was then separated into a solid and a liquid phase using a centrifugal separating machine, and the concentration C (wt%) of stearic acid in the supernatant of the solution was measured using conventional gas chromatography.

The adsorption amount of stearic acid per unit area of the ferromagnetic particles was calculated by the following equation.

$$\text{Adsorption Amount of Stearic Acid} = \frac{1 - 50 \times C}{5 \times SSA \times MW}$$

SSA: specific surface area of ferromagnetic particles (B. E. T. Method)
MW: molecular weight of stearic acid (284)

The following composition was mixed, kneaded and dispersed in a ball mill for 48 hours, 5 parts of polyisocyanate was added thereto and the system was further mixed, kneaded and dispersed for 1 hour, and filtered using a filter having an average pore diameter of 1 μm to prepare a magnetic coating composition. The thus-obtained magnetic coating composition was coated on a polyethylene terphthalate support having a thickness of 10 μm in a dry thickness of 4.0 μm.

Composition for a Magnetic Layer

| | Parts |
| --- | --- |
| Ferromagnetic particles Surface treated Co-modified magnetic iron oxide (Sample No. C) | 100 |
| Polar group containing copolymer of vinyl chloride type (polar group: —SO$_3$Na, concentration of the polar group: 4.8 × 10$^{-5}$ equivalent/g, degree of polymerization: 400) | 10 |
| Polyurethane resin (butyl adipate type, number average molecular weight: 50,000) | 8 |
| Abrasive agent (α-alumina, average particle size: 0.2 μm) | 1 |
| Stearic acid | 1 |
| Carbon black (average particle size: 40 mμ) | 4 |
| Methyl ethyl ketone | 300 |

The nonmagnetic support coated with a magnetic coating composition was subjected to magnetic orientation using 3,000 gauss magnets while the coating composition was undried, and, after drying, the magnetic layer was subjected to supercalendering and slit to a width or ½ inch to prepare a video tape.

EXAMPLE 2

By following the same procedure as in Example 1, a video tape was prepared, except that Sample B was used as ferromagnetic particles and a copolymer of vinyl chloride having the polar group —OPO$_3$H$_2$ and a polar group concentration of 7.6×10$^{-6}$ equivalent/g were used.

EXAMPLE 3

By following the same procedure as in Example 2, a video tape was prepared, except that a copolymer of vinyl chloride having the polar group —COOH and a polar group concentration of 5.0×10$^{-4}$ equivalent/g was used.

EXAMPLE 4

By following the same procedure as in Example 1, a video tape was prepared, except that a copolymer of vinyl chloride having the polar group —SO$_3$H and a polar group concentration of 5.8×10$^{-5}$ equivalent/g was used.

EXAMPLE 5

By following the same procedure as in Example 1, a video tape was prepared, except that 0.5 part of myristic acid and 0.5 part of oleic acid were used instead of 1 part of stearic acid.

COMPARATIVE EXAMPLE 1

By following the same procedure as in Example 1, a video tape was prepared, except that a copolymer of vinyl chloride having the polar group of —OH and a polar group concentration of 4.7×10$^{-5}$ equivalent/g was used.

COMPARATIVE EXAMPLE 2

By following the same procedure as in Example 1, a video tape was prepared, except that a copolymer of vinyl chloride having no polar group was used.

COMPARATIVE EXAMPLE 3

By following the same procedure as in Example 1, a video tape was prepared, except that Sample E was used as ferromagnetic particles.

COMPARATIVE EXAMPLE 4

By following the same procedure as in Example 2, a video tape was prepared, except that Sample A was used as ferromagnetic particles.

The physical properties of the thus-obtained video tapes were tested in the following manner.

Surface Gloss

The gloss on the surface of the magnetic layer at an angle of incidence of light of 60° was measured. This value is a relative value when the degree of mirror gloss on the surface of a glass having a refractive index of 1.567 is assumed to be 100%. A digital photometer manufactured by Suga Testing Machine Co., Ltd. was used.

Friction Coefficient

When a video tape was contacted with a stainless steel pole at a tension ($T_1$) of 50 g at a contact angle of 180°, the tension ($T_2$) which was necessary to make the video tape run at a rate of 3.3 cm/s was measured. The friction coefficient at running for 1 pass of the video tape was obtained using the following equation based on the above-measured values.

$$\mu = 1/\pi \ln (T_2/T_1)$$

Further, the friction coefficient at running for 100 passes was measured by the above method using the video tape which was run for 99 passes.

Still Durability

The specific video signals were recorded on each sample tape using the above video tape recorder, and then the output of still image which was obtained by reproducing the tape was recorded. And the time when the output began to be remarkably decreased was measured. The experiment was carried out at a temperature of 5° C. and a relative humidity of 80%.

The results of the measurements are shown in Table 2.

TABLE 2

| Example No. | Surface Gloss | Friction Coefficient 1 Pass | Friction Coefficient 100 Passes | Still Durability (min) |
|---|---|---|---|---|
| Example 1 | 147 | 0.27 | 0.25 | 60 or more |
| Example 2 | 155 | 0.32 | 0.29 | " |
| Example 3 | 135 | 0.30 | 0.30 | " |
| Example 4 | 150 | 0.26 | 0.26 | " |
| Example 5 | 148 | 0.30 | 0.28 | " |
| Comparative Example 1 | 98 | 0.27 | 0.29 | 2 |
| Comparative Example 2 | 32 | 0.31 | 0.35 | 1 |
| Comparative Example 3 | 94 | 0.25 | 0.26 | 5 |
| Comparative Example 4 | 146 | 0.43 | 0.47 | 2 |

As is clear from the results of Table 2, Examples 1 to 4 using ferromagnetic particles having a predetermined adsorption amount of stearic acid and a polymer having predetermined polar groups exhibited high surface gloss, a low friction coefficient, an excellent still durability and improved running properties, proving the excellent dispersibility and good lubricating effects of fatty acids, and further obtained stable running properties in which the friction coefficient was not increased even if repeated running was carried out. Example 5 showed that fatty acids other than stearic acid could provide a good lubricating effect.

On the other hand, Comparative Examples 1 and 2 showed that when ferromagnetic particles having a predetermined adsorption amount of stearic acid as defined herein were used, and polymers with or without polar groups which were not in accordance with the present invention were used, the friction coefficient was improved, but dispersibility was insufficient, surface gloss was low and further the still durability was also seriously deteriorated.

In Comparative Example 3, although polymers having a polar group as defined herein were used, due to the low adsorption amount of stearic acid of ferromagnetic particles, the still durability and dispersibility were insufficient, but the friction coefficient was improved.

In Comparative Example 4, when surface untreated ferromagnetic particles having a high adsorption amount of stearic acid and polymers having a predetermined polar group as defined herein were used, dispersibility was improved, but the friction coefficient was high because the lubricating effect of the fatty acid was low and further the still durability was also deteriorated.

EXAMPLE 6

Preparation of Surface Treated Ferromagnetic Particles (2)

$\gamma$-$Fe_2O_3$ (specific surface area: 41 $m^2/g$, average particle size: 0.2 $\mu m$, acicular ratio: 8) was dispersed to obtain an aqueous slurry of the $\gamma$-$Fe_2O_3$. Further, ferrous sulfate having an $Fe^{2+}$ ion content of 8 atom% based on Fe of the $\gamma$-$Fe_2O_3$ was added to the obtained aqueous slurry of the $\gamma$-$Fe_2O_3$ in an atmosphere of nitrogen, and then the resulting solution was neutralized by adding sodium hydroxide. Successively, cobalt sulfate having a Co content of 3.8 atom% based on Fe of the $\gamma$-$Fe_2O_3$ was added to the neutralized slurry solution.

The thus-obtained slurry solution was adjusted by adding NaOH to obtain an alkali concentration of 1 N of the solution, and was heated and maintained to 100° C. for 4 hours.

The slurry solution was filtered off, washed, and then adjusted to obtain an alkali concentration of about $1 \times 10^{-3}$ N. Further, a water-soluble water glass (i.e., sodium silicate) was added to the slurry solution pH-adjusted and then an aqueous aluminum chloride solution was added to the slurry solution so that the pH of the slurry solution became about 7.5. The slurry solution of which the pH was adjusted was charged in a sealed tank having a stirrer, nitrogen-substituted and then heat treated at the temperature of 150° C. for 3 hours while stirring. Thereafter, the slurry solution treated was filtered off, washed, and then dried at 60° C. to obtain a surface treated Co-modified magnetic iron oxide.

Following the same procedure as described above, surface treated Co-modified magnetic iron oxides (Samples G to L) were obtained, provided that the ratio (wt%) of water-soluble water glass to Fe in the Co-modified magnetic iron oxide in terms of Si conversion and the ratio (wt%) of aluminum chloride to Fe in the Co-modified magnetic iron oxide in terms of Al conversion were varied.

The adsorption amount of stearic acid of each sample was measured in the same manner as described in Example 1. The results obtained are shown in Table 3.

TABLE 3

| Sample No. | Amount of Water-Soluble Glass* (wt %) | Amount of Aluminum oxide** (wt %) | Adsorption Amount of Stearic Acid (mol/$m^2$) | Surface Area ($m^2/g$) | Coercive Force of Magnetic Particles (Oe) |
|---|---|---|---|---|---|
| G | 0 | 0 | $7.0 \times 10^{-6}$ | 38.2 | 640 |
| H | 0.2 | 0.04 | $6.0 \times 10^{-6}$ | 38.0 | 655 |
| I | 0.4 | 0.08 | $4.5 \times 10^{-6}$ | 37.7 | 650 |
| J | 0.6 | 0.12 | $3.8 \times 10^{-6}$ | 37.5 | 653 |
| K | 0.8 | 0.12 | $3.1 \times 10^{-6}$ | 37.2 | 657 |
| L | 1.0 | 0.16 | $2.5 \times 10^{-6}$ | 37.5 | 656 |

*Si conversion
**Al conversion

EXAMPLE 7

Preparation of Surface Treated Ferromagnetic Particles (3)

FeOx (x=1.38, $Fe^{2+}$ ratio 0.31, surface area: 30 m$^2$/g) in which $Fe_3O_4$ was stabilized by the gradual oxidation was dispersed to obtain an aqueous slurry of the FeOx. Further, ferrous sulfate having an $Fe^{2+}$ amount of 5 atom% based on Fe of the FeOx was added to the obtained aqueous slurry of the FeOx in an atmosphere of nitrogen and then the resulting slurry solution was neutralized by adding sodium hydroxide. Successively, cobalt sulfate having a Co content of 3.5 atom% based on Fe of the FeOx was added to the neutralized slurry solution.

The thus-obtained slurry solution was adjusted by adding NaOH to obtain an alkali concentration of 0.8 N of the solution, and was heated and maintained to 100° C. for 3 hours.

After the slurry solution was filtered off, water was added to the solution to obtain an aqueous slurry. Then, a water-soluble water glass (i.e., sodium silicate) was added to the obtained aqueous slurry solution. Successively, after calcium chloride was added to the aqueous slurry solution to obtain an aqueous slurry solution having a pH of 8.0, the slurry solution of which the pH was adjusted was charged in a sealed tank having a stirrer, nitrogen-substituted, and then heat treated at the temperature of 150° C. for 3 hours while stirring. Thereafter, the slurry solution treated was filtered off, washed, and then dried at 60° C. to obtain a surface treated Co-modified magnetic iron oxide.

Following the same procedure as described above, surface treated Co-modified magnetic iron oxides (Samples M to P) were obtained, provided that the ratio (wt%) of water-soluble glass to Fe in the Co-modified magnetic iron oxide in terms of Si conversion and the ratio (wt%) of aluminum chloride to Fe in the Co-modified magnetic iron oxide in terms of Ca conversion were varied.

The adsorption amount of stearic acid of each sample was measured in the same manner as described in Example 1. The results obtained are shown in Table 4.

TABLE 4

| Sample No. | Amount of Water-Soluble Glass* (wt %) | Amount of calcium oxide** (wt %) | Adsorption Amount of Stearic Acid (mol/m$^2$) | Surface Area (m$^2$/g) | Coercive Force of Magnetic Particles (Oe) |
|---|---|---|---|---|---|
| M | 0 | 0 | 8.1 × 10$^{-6}$ | 28 | 620 |
| N | 0.6 | 0.3 | 5.3 × 10$^{-6}$ | 27.5 | 635 |
| O | 0.8 | 0.3 | 3.5 × 10$^{-6}$ | 27.3 | 638 |
| P | 1.0 | 0.4 | 2.5 × 10$^{-6}$ | 27.5 | 630 |

*Si conversion
**Ca conversion

The following composition was mixed, kneaded and dispersed in a sand grinder for 3 hours, and then 8 parts of a polyisocyanate type hardening agent ("Collonate L", manufactured by Nippon Polyurethane Co., Ltd.), 5 parts of stearic acid, and 5 parts of butyl acetate were added, mixed, and dispersed for 15 minutes.

Thereafter, the dispersed composition was filtered using a filter having an average pore diameter of 1 μm to prepare a magnetic coating composition.

The thus-obtained magnetic coating composition was simultaneously coated for plural magnetic layers on a polyethylene terephthalate support having a thickness of 15 μm using an extrusion type simultaneous multiple layer coating device having one head and two slits as shown in FIG. 1, under the conditions that the coating speed is 100 m/minute, the amount of first coating solution supplied is 20 ml/m$^2$, and the amount of the second coating solution supplied is 4 ml/m2 The obtained support having plural magnetic layers which were coated with a magnetic coating composition was subjected to magnetic orientation using 3,000 gauss magnets while the coating composition was undried, and after drying, the plural magnetic layers were subjected to calendering and thermosetting treatment, and then were slit to a width of ½ inch to prepare a video tape.

|  | Parts |
|---|---|
| Ferromagnetic particles (See Table 5) | 100 |
| Abrasive agent | 3 |
| (α-alumina, average particle size: 0.35 μm, specific surface area (S$_{BET}$): 7.5 m$^2$/g) | |
| Carbon black | 3 |
| (average particle size: 20 mμ) | |
| Polar group-containing copolymer of vinyl chloride type | 12 |
| (see Table 5) | |
| Polyurethane resin | 12 |
| ("N 2301", manufactured by Nippon Polyurethane Co., Ltd.) | |
| Methyl ethyl ketone | 160 |
| Normal butyl acetate | 160 |

Thus, the surface gloss, friction coefficient (after 1 pass and 100 passes) and still durability of the obtained video tapes were measured using a commercial video recorder ("NV 8200", manufactured by Matsushita Electric Industrial Co., Ltd.).

The combination of ferromagnetic particles and polar group-containing copolymers of vinyl chloride type which were used, and the results of evaluation over the measurement are shown in Table 5.

The measuring method as described above is the same as in Example 1 and Comparative Example 4.

TABLE 5

| Sample No. | First Coating Solution (lower layer) | | | Second Coating Solution (upper layer) | | | Surface Gloss | Friction Coefficient | | Still Durability (minute) |
| | Ferromagnetic Particles | | | Ferromagnetic Particles | | | | | | |
| | Kind Sample No | Adsorption Amount of Stearic Acid (mol/m$^2$) | Polar Group Contained in Binder* | Kind Sample No | Adsorption Amount of Stearic Acid (mol/m$^2$) | Polar Group Contained in Binder | | After 1 Pass | After 100 Passes | |
|---|---|---|---|---|---|---|---|---|---|---|
| 1 (Invention) | K | 3.1 × 10$^{-6}$ | —COOH | K | 3.1 × 10$^{-6}$ | —COOH | 145 | 0.25 | 0.24 | 60 or more |
| 2 (Invention) | H | 6.0 × 10$^{-6}$ | " | J | 3.8 × 10$^{-6}$ | " | 150 | 0.31 | 0.30 | 60 or more |
| 3 | G | 7.0 × 10$^{-6}$ | " | G | 7.0 × 10$^{-6}$ | " | 140 | 0.38 | 0.47 | 5 |

TABLE 5-continued

| Sample No. | First Coating Solution (lower layer) Ferromagnetic Particles Kind Sample No | Adsorption Amount of Stearic Acid (mol/m$^2$) | Polar Group Contained in Binder* | Second Coating Solution (upper layer) Ferromagnetic Particles Kind Sample No | Adsorption Amount of Stearic Acid (mol/m$^2$) | Polar Group Contained in Binder | Surface Gloss | Friction Coefficient After 1 Pass | Friction Coefficient After 100 Passes | Still Durability (minute) |
|---|---|---|---|---|---|---|---|---|---|---|
| 4 (Comparison) | L | $2.5 \times 10^{-6}$ | " | L | $2.5 \times 10^{-6}$ | " | 130 | 0.26 | 0.28 | 15 |
| 5 (Comparison) | M | $8.1 \times 10^{-6}$ | " | M | $8.1 \times 10^{-6}$ | " | 150 | 0.36 | 0.43 | 7 |
| 6 (Comparison) | N | $5.3 \times 10^{-6}$ | " | O | $3.5 \times 10^{-6}$ | " | 155 | 0.29 | 0.26 | 60 or more |
| 7 (Invention) | P | $2.5 \times 10^{-6}$ | " | P | $2.5 \times 10^{-6}$ | " | 125 | 0.27 | 0.29 | 10 |
| 8 (Comparison) | N | $5.3 \times 10^{-6}$ | " | J | $3.8 \times 10^{-6}$ | —SO$_3$Na | 160 | 0.28 | 0.27 | 55 |
| 9 (Invention) | O | $3.5 \times 10^{-6}$ | " | I | $4.5 \times 10^{-6}$ | " | 158 | 0.29 | 0.29 | 60 or more |
| 10 (Invention) | M | $8.1 \times 10^{-6}$ | " | G | $7.0 \times 10^{-6}$ | " | 143 | 0.38 | 0.45 | 5 |
| 11 (Comparison) | P | $2.5 \times 10^{-6}$ | " | L | $2.5 \times 10^{-6}$ | " | 127 | 0.26 | 0.29 | 10 |
| 12 (Comparison) | O | $3.5 \times 10^{-6}$ | —SO$_3$Na | C | $3.2 \times 10^{-6}$ | " | 160 | 0.26 | 0.23 | 55 |
| 13 (Invention) | M | $8.1 \times 10^{-6}$ | " | A | $7.5 \times 10^{-6}$ | " | 150 | 0.41 | 0.47 | 1 |
| 14 (Comparison) | N | $5.3 \times 10^{-6}$ | —OPO$_3$H$_2$ | D | $3.1 \times 10^{-6}$ | —OPO$_3$H$_2$ | 161 | 0.23 | 0.23 | 53 |
| 15 (Invention) | M | $8.1 \times 10^{-6}$ | " | A | $7.5 \times 10^{-6}$ | " | 150 | 0.40 | 0.45 | 2 |
| (Comparison) | | | | | | | | | | |

*Polar group-containing copolymer of vinyl chloride and vinyl acetate

As is apparent from the results of Table 5, examples (i.e., samples) of the present invention in which the ferromagnetic particles having the specific adsorption amount of stearic acid and the polymers containing the specific polar group according to the present invention are used in combination have high surface gloss, low friction coefficient and excellent still durability.

On the other hand, even though the polymers containing the specific polar group of the present invention are used as binders, if the adsorption amount of stearic acid of the ferromagnetic particles used is lower than $3 \times 10^{-6}$ mol/m$^2$, the still durability and dispersibility of the obtained tapes are insufficient for practical use though the friction coefficient is improved. Further, when the ferromagnetic particles having high adsorption amount of stearic acid (i.e., more than $6 \times 10^{-6}$ mol/m$^2$) which are not surface treated, and the polymers containing the specific polar group according to the present invention are used in combination, the friction coefficient and still durability of the tapes obtained are decreased though the dispersibility is improved.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon a single magnetic layer or plural magnetic layers containing ferromagnetic particles dispersed in a binder, wherein said ferromagnetic particles are ferromagnetic particles of magnetic iron oxide having an adsorption amount of stearic acid of from $3 \times 10^{-6}$ to $6 \times 10^{-6}$ mol/m$^2$ per a surface area thereof; said binder contains at least one polymer having at least one polar group selected from the group consisting of —SO$_3$M, —OSO$_3$M, —COOM, —PO(OM')$_2$ and —OPO(OM')$_2$ in which M represents Na, Li, K, a hydrogen atom, NR$_4$ or NHR$_3$, M' represents Na, Li, K, a hydrogen atom, NR$_4$, NHR$_3$ or an alkyl group, and R$_3$ and R$_4$ represent a lower alkyl group; and said magnetic layer further contains at least one fatty acid.

2. The magnetic recording medium as claimed in claim 1, wherein said lower alkyl group has from 1 to 8 carbon atoms.

3. The magnetic recording medium as claimed in claim 1, wherein said fatty acid has from 8 to 22 carbon atoms.

4. The magnetic recording medium as claimed in claim 1, wherein the content of said fatty acid is from 0.01 to 10.0 wt% based on the weight of the ferromagnetic particles.

5. The magnetic recording medium as claimed in claim 1, wherein said polymer is a copolymer of vinyl chloride and vinyl acetate type, a copolymer of vinyl chloride and vinylidene chloride, acrylic resins, polyester resins, polyvinyl fluoride, polyamide resins, polyvinyl butyrate and a copolymer of styrene and butadiene, having at least one polar group.

6. The magnetic recording medium as claimed in claim 5, wherein said polymer is a copolymer of vinyl chloride and vinyl acetate having at least one polar group.

7. The magnetic recording medium as claimed in claim 1, wherein the polymer having at least one polar group contains the polar group in an amount of from $1 \times 10^{-6}$ to $1 \times 10^{-3}$ equivalent/g.

8. The magnetic recording medium as claimed in claim 1, wherein the polymer having at least one polar group is used in an amount of from 10 to 100 parts by weight per 100 parts by weight of the ferromagnetic particles.

9. The magnetic recording medium as claimed in claim 1, wherein said ferromagnetic particles have a specific surface area of 25 m$^2$/g or higher.

* * * * *